(No Model.) 3 Sheets—Sheet 1.

A. H. LIGHTHALL.
TAKE-UP MECHANISM FOR ENDLESS CABLE RAILROADS.

No. 288,948. Patented Nov. 20, 1883.

WITNESSES
Kilmer Bradford
Edwin Derby

INVENTOR—
Almerin H. Lighthall
By J. C. Tasker,
Attorney—

(No Model.) 3 Sheets—Sheet 2.
A. H. LIGHTHALL.
TAKE-UP MECHANISM FOR ENDLESS CABLE RAILROADS.
No. 288,948. Patented Nov. 20, 1883.
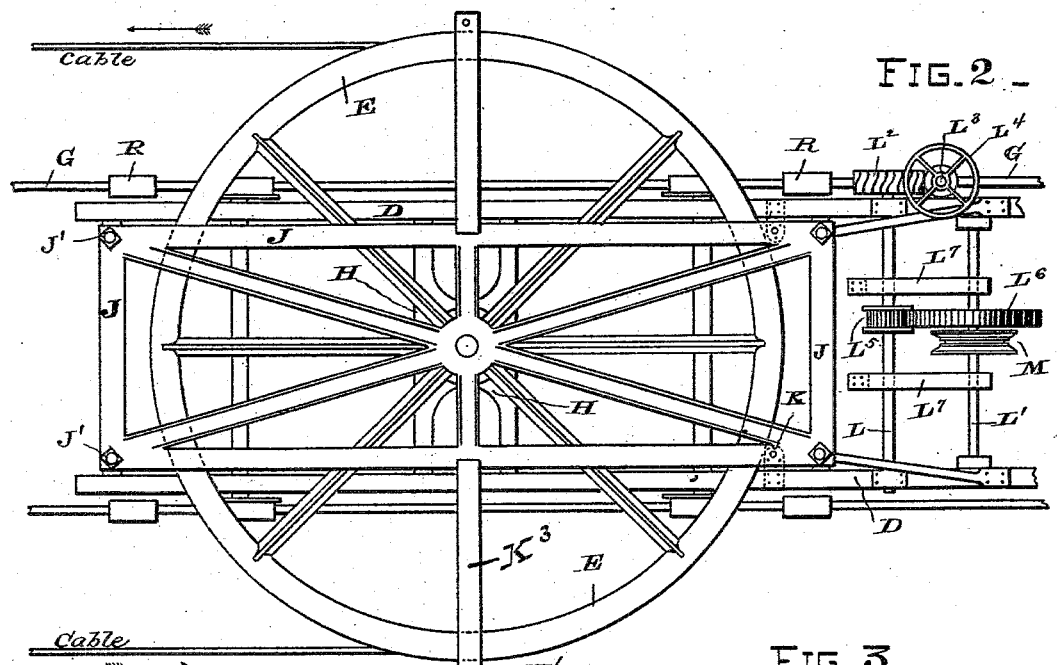
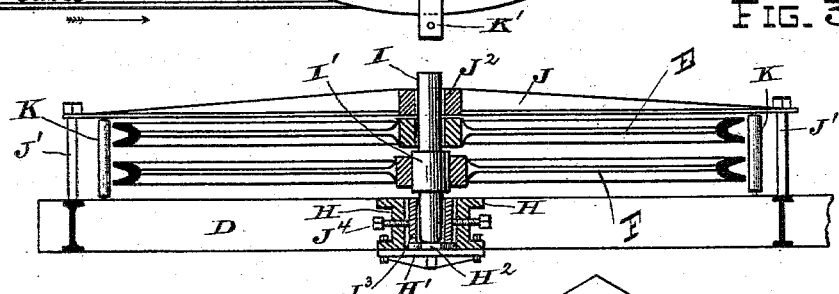
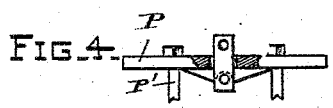
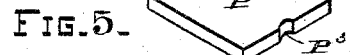
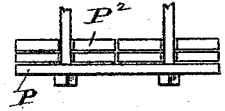
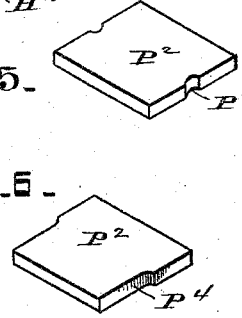
WITNESSES—
Wilmer Bradford
Edwin Derby
INVENTOR—
Almerin H. Lighthall
By J. C. Tasker,
Attorney (No Model.)

A. H. LIGHTHALL.

TAKE-UP MECHANISM FOR ENDLESS CABLE RAILROADS.

No. 288,948. Patented Nov. 20, 1883.

3 Sheets—Sheet 3.

WITNESSES.
Wilmer Bradford
Edwin Derby

INVENTOR.
Almerin H. Lighthall
By J. C. Tasker
Attorney

UNITED STATES PATENT OFFICE.

ALMERIN H. LIGHTHALL, OF SAN FRANCISCO, CALIFORNIA.

TAKE-UP MECHANISM FOR ENDLESS-CABLE RAILROADS.

SPECIFICATION forming part of Letters Patent No. 288,948, dated November 20, 1883.

Application filed October 13, 1883. (No model.)

*To all whom it may concern:*

Be it known that I, ALMERIN H. LIGHTHALL, a citizen of the United States, residing at San Francisco, in the county of San Francisco and State of California, have invented certain new and useful Improvements in Take-Up Mechanism for Endless-Cable Railroads, of which the following is a specification.

My invention relates to an improved mechanism for taking up the slack of the endless cable and causing it be kept taut throughout its entire length, thereby insuring its even and regular winding and paying out from the drums in the engine-house, preventing danger of accidents from a slackened cable dropping from the carrying-pulleys, sudden jerks or strains upon a slackened portion of the rope, caused by a dummy suddenly gripping the rope, and, in general, to cause a much smoother and more even operation or movement of the traveling cable than has heretofore been attained, thereby lessening the cost for repairs and the danger of accident to the cars, grips, cable, and cable-way. These objects I accomplish by means of the mechanism illustrated in the accompanying drawings, in which—

Figure 1:
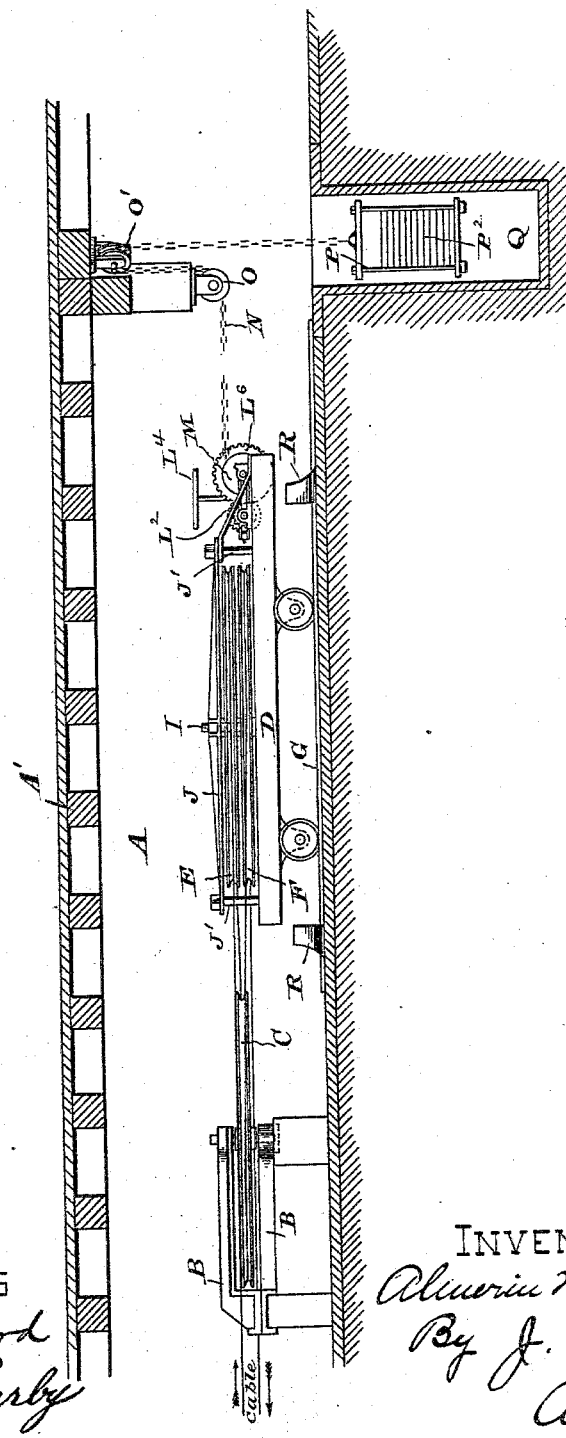
Figure 7:
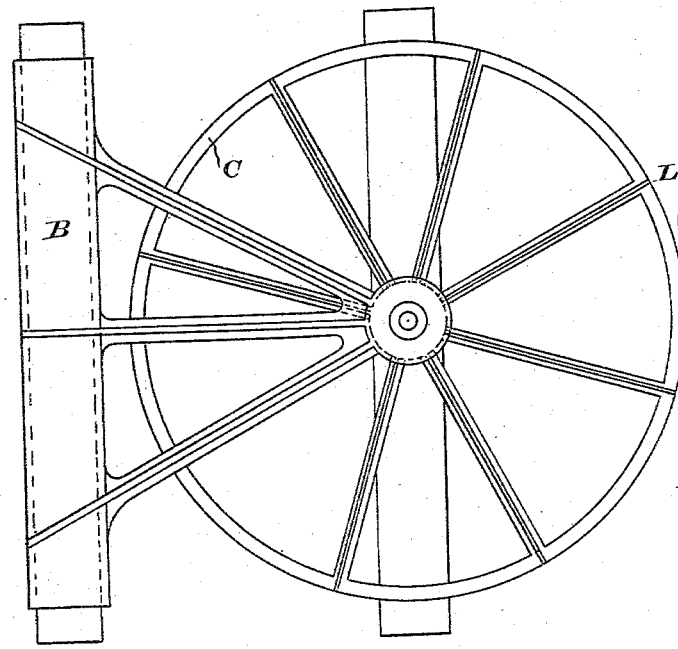
Figure 9:
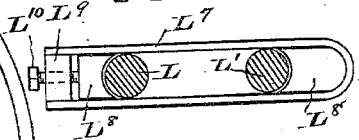
Figure 10:
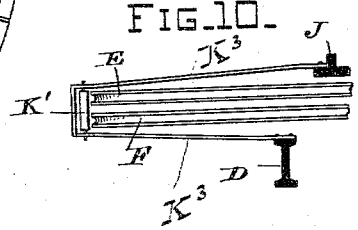
Figure 8:
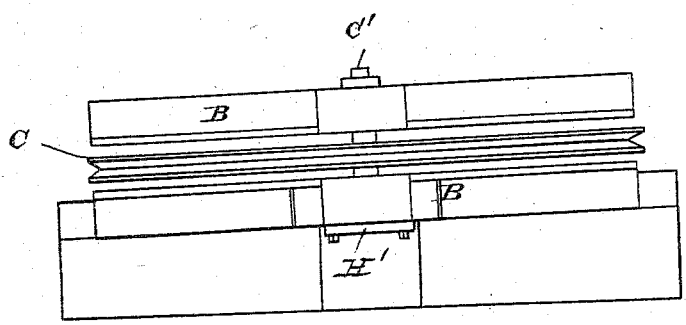

Figure 1 is a longitudinal section through the take-up chamber, showing the take-up mechanism in side elevation. Fig. 2 is a plan view of the sliding take-up carriage, and Fig. 3 is a longitudinal vertical sectional view of the same. Fig. 4 is a detail view of the weight or balance frame, and Figs. 5 and 6 are perspective views of different forms of weights. Fig. 7 is a plan view of the fixed or idler pulley, and Fig. 8 is a side view of the same. Figs. 9 and 10 are detail views.

Similar letters of reference are used to designate like parts throughout the several views.

The take-up chamber A is constructed beneath the roadway or street at the end or terminus of the cable railroad, and is provided with a stout roof, A', which supports the roadway or street pavement, and also forms a support or bearing for the pulleys of the weight-chain.

At the forward end of the chamber A, and near the terminus of the cable-tunnel, I construct a suitable iron frame-work, B, which is supported upon base timbers to bring it up to the required elevation. This iron frame is bifurcated, as shown in Fig. 7, and carries within its upper and lower arms the journal boxes or steps of the vertically-inclined axle of the idler-wheel C, which is set between the forked or upper and lower arms of the frame B, and is slightly tilted from a horizontal line, as shown in Fig. 8. The movable carriage D, which carries the active pulleys E and F, is mounted upon car-wheels, and is adapted to travel back and forth upon a track, G, laid on the floor of the chamber. This carriage is rectangular in form, and composed of cast-iron beams properly secured together. Near the center of this frame I attach a casting, H, provided with a central opening, the bottom of which is closed by a removable plate, H', having an upwardly-projecting flat-faced steel button, H², which forms the end bearing of the spindle I of the two active wheels or pulleys E and F, the whole being surmounted by a removable cast-iron frame, J, which is secured upon four posts, J', and has at its center a top bearing, J², for the upper end of the spindle I. Within the central aperture in the casting H, and surrounding the lower end of the spindle I, I place a sleeve, J³, which closely fits the spindle, yet has considerable space between its outer side and the side of the opening within which it is placed. Set-screws J⁴ are tapped through the four sides of the casting H, and bear against the sides of the sleeve J³, and by tightening or slackening these screws the sleeve can be moved from side to side and the spindle I be "centered" upon its step. It should here be remarked that the spindle C' of the idler-pulley C is stepped in the same manner as that above described, and that by removing the lower plate, H', the spindles may be knocked out from above and the pulleys slid out from the side of their supporting-frames, either for replacement or repairs. The lower active pulley, F, is keyed upon a swell or re-enforce, I', formed upon the spindle I, as shown in Fig. 3, and the top face of this re-enforce forms a step or base bearing upon which the hub of the upper wheel, E, rests, the same being loosely journaled upon the spindle I, the object being to pivot two wheels upon the same shaft in such a manner that each may revolve independently of the other.

In order that the rope may be kept from falling out of the grooves in the pulley-wheels, I provide a series of vertical spindles, K K', held in place by brackets K³, attached to the main frame-work, and in such a manner as to bring the face of the spindles close to but not touching the rim of the wheels, as seen in Figs. 3 and 10.

The rear end of the main frame or carriage is provided with journal-boxes carrying two axles or shafts, L L', the shaft L being placed next the pulley-wheels, and provided upon its outer end with a worm-wheel, L², which meshes with a worm-shaft, L³, held and stepped in bearings attached to the side of the carriage-frame, and surmounted by a hand-wheel, L⁴. About midway of the length of this shaft I place the spur-pinion L⁵, which meshes with the spur-wheel L⁶ upon the shaft L', upon which is also secured, at the exact center thereof, the chain-wheel M, which carries the chain N. This chain, after leaving the wheel M, passes under a pulley, O, attached to a cross-timber depending some distance from the roof of the chamber, and thence over a pulley, O', attached directly to the roof, and down to the weight-frame P, suspended in the pit Q. This weight-frame is composed of a top and bottom piece of plate-iron connected by stout iron rods P' near each corner. The weights P² are made of flat pieces of cast-iron, of the form shown, the lower pieces, Fig. 5, having side grooves, P³, which receive the rods P', and are thereby held to place. The upper pieces, Fig. 6, are recessed at P⁴, to admit of their being slid into the frame from either end. The front and back axles, L and L', are secured and braced together by clips L⁷ L⁷, which cross from the front to the rear on either side of the chain-wheel M, in order that all the tension from the counter-weight may not come upon one shaft alone. These clips are provided with bearing-blocks L⁸ upon the pressure side of the axle, the box for the axle L being made adjustable by a set-screw, L¹⁰, working through a fixed block, L⁹, set in the end of the clip.

The operation of my improved cable take-up will be as follows, to wit: The incoming cable is first passed around the upper active pulley, E, on the movable carriage. It is then passed around the fixed or idle pulley C, and from thence back to the lower active pulley, F, from which it passes out to the cable-tunnel again. The chain-winding gearing is now operated, and the length of chain between the wheel and the weight-frame is adjusted to suit the ordinary amount of "give" or slacking of the rope. Should the rope run taut or shorten up, it will draw the movable carriage forward upon the rails; but owing to the equalizing effect of the three pulleys the shortening will be gradual, and the speed of both the ingoing and outgoing cable will be equal. Should the cable stretch or slacken, (which can only occur with the incoming cable,) the weight in the pit will draw the carriage backward and cause a tightening up of the rope or cable; but such tightening will be gradual, as the slack is first taken up by the top wheel on the carriage and then passes to the fixed idler and back to the lower active pulley, and as these pulleys act upon the principle of a differential pulley it will be readily seen that as the slack comes in the carriage runs back, and the wheels or pulleys, all running at an unequal rate of speed, will absorb the whole of the slack before it can enter the cable-tunnel, and the whole of the strain or tension of the rope will be taken by the fixed idler.

To guard against accident to the take-up mechanism, in the event of the breakage of the chain connecting the weight and movable carriage, or of the cable itself, I place buffers upon the rails on which the carriage travels. These buffers or chocks are made breast-high to the car-wheels, and are removable, so that they may be slid backward or forward along the track, the distance between the front and rear buffers being equal to the estimated play of the movable carriage.

Having thus described my invention, what I claim, and desire to secure by Letters Patent, is—

1. In a take-up mechanism for endless-cable railroads, the combination, with cable or rope thereof, of a fixed idler-pulley, a horizontally-moving carriage carrying two active pulleys arranged to revolve independently of each other, and suspended balance-weight connected to the carriage, substantially as shown, and for the purpose set forth.

2. In a take-up mechanism for endless-cable railroads, the movable carriage D, carrying two active pulleys, E and F, upon a vertically-stepped shaft, I, covering-frame J, mounted upon posts J', and cable-guide spindles K and K', constructed, arranged, and operating substantially in the manner and for the purpose set forth.

3. In combination with a take-up carriage for endless-cable railroads and running upon a track, G, the buffer blocks or chocks R, substantially as and for the purpose set forth.

4. In a take-up mechanism for endless-cable railroads, the combination, with a movable carriage containing cable-carrying wheels, of a counterbalancing-weight suspended from hanging pulleys by a chain connected with a chain-winding mechanism carried upon the movable carriage hereinbefore described, substantially in the manner and for the purpose set forth and specified.

In testimony whereof I affix my signature in presence of two witnesses.

ALMERIN H. LIGHTHALL.

Witnesses:
A. R. BROWN,
PHILIP MAURO.